US011093018B2

(12) United States Patent
Yu et al.

(10) Patent No.: US 11,093,018 B2
(45) Date of Patent: Aug. 17, 2021

(54) SLEEP-WAKE CONTROL CIRCUIT FOR BATTERY POWERED ELECTRONIC DEVICE

(71) Applicant: KARMA AUTOMOTIVE LLC, Irvine, CA (US)

(72) Inventors: Xiaohang Yu, Irvine, CA (US); Geng Niu, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 16/524,461

(22) Filed: Jul. 29, 2019

(65) Prior Publication Data

US 2021/0034134 A1 Feb. 4, 2021

(51) Int. Cl.
*G06F 1/3234* (2019.01)
*B60R 16/033* (2006.01)
*G07C 5/08* (2006.01)

(52) U.S. Cl.
CPC .......... *G06F 1/3243* (2013.01); *B60R 16/033* (2013.01); *G07C 5/08* (2013.01)

(58) Field of Classification Search
None
See application file for complete search history.

(56) References Cited

U.S. PATENT DOCUMENTS

| 7,231,533 | B2 | 6/2007 | Darmawaskita et al. | |
|---|---|---|---|---|
| 9,449,655 | B1* | 9/2016 | Zonte | G11C 16/26 |
| 9,673,791 | B2 | 6/2017 | Wakasugi et al. | |
| 2015/0244274 | A1* | 8/2015 | Fahlenkamp | H02M 3/33592 363/21.15 |
| 2016/0311326 | A1* | 10/2016 | Steele | B60L 50/60 |
| 2018/0150118 | A1* | 5/2018 | Kalam | G06F 1/3209 |
| 2019/0341803 | A1* | 11/2019 | Cook | H03K 3/037 |

FOREIGN PATENT DOCUMENTS

| DE | 10 2009 019 609 A1 | 11/2010 |
|---|---|---|
| JP | 2007-022355 A | 2/2007 |
| JP | 2017-119512 A | 7/2017 |

OTHER PUBLICATIONS

International Search Report and Written Opinion of the International Searching Authority dated Nov. 12, 2020 issued in related International Patent Application No. PCT/US2020/043914; filed Jul. 28, 2020.

* cited by examiner

*Primary Examiner* — Seokjin Kim
(74) *Attorney, Agent, or Firm* — Gordon Rees Scully Mansukhani, LLP

(57) ABSTRACT

A sleep-wake control circuit using a D-type flip-flop with a Schmitt trigger to detect pulse wake-up signal transitions. The sleep-wake control circuit comprises a sleep command input channel, a wake command input channel, and a D-type flip-flop. The D-type flip-flop is configured to receive a signal to switch to sleep mode from the sleep command input channel as a clock signal and to receive a wake event signal to switch to wake mode from the wake command input channel as a clear signal, such that a wake event signal from the wake command input channel takes priority over a sleep event signal from the sleep command input channel. The sleep command input channel and the wake command input channel are configured to include Schmitt triggers so as to detect pulse input signals.

1 Claim, 4 Drawing Sheets

| PRE | D | CLR | CLK | Q | $\overline{Q}$ | Mode |
|-----|---|-----|-----|---|---|------|
| 0 | 1 | 0 | ↓ | $Q_{prev}$ | $\overline{Q}_{prev}$ | (Prev.) |
| 0 | 1 | 0 | ↑ | 1 | 0 | Sleep |
| 0 | 1 | 1 | X | 0 | 1 | Wake |

SLEEP-WAKE CONTROL CIRCUIT FOR BATTERY POWERED ELECTRONIC DEVICE

BACKGROUND

The present disclosure relates to a sleep-wake control circuit for controlling the state of an electronic control unit (ECU), wherein the ECU contains a processor, microcontroller, or microprocessor.

In certain applications related to the operation of electric vehicles, it is typical for an electronic device such as an ECU to remain operating in a reduced functionality or sleep mode. While in sleep mode, it may be necessary for the electronic device to draw a "quiescent current" to maintain certain functions and to allow the electronic device to detect a command to switch from sleep mode to operating/wake mode.

However minimal a quiescent current is though, its value is non-zero. Thus, for a battery powered device, the greater a quiescent current consumption is, the greater the draw on the battery. This may require an operator to recharge the battery more frequently and, over a longer period of time, degrade the performance of the battery.

There are other logistical challenges to consider with a device's sleep mode. Ideally, when a device receives a command to switch from sleep mode to wake mode, the device should respond rapidly and reliably. Utilizing discrete transistors and field-effect transistors (FETs) to manage a device's sleep mode and wake mode can introduce parasitic parameters which can interfere with signal edge detection and result in additional power dissipations, resulting in a less rapid and reliable response to a wake command. Further, the device may receive sleep or wake commands from multiple sources, including but not limited to signals from other ECUs, signals from devices monitoring the vehicle's operation conditions, and signals from an occupant or owner of the vehicle. Managing these multiple sources while also properly ordering and scheduling the signals is critical in designing a sleep-wake control circuit that operates rapidly and reliably.

It is desirable to produce a sleep-wake control circuit that operates fast and reliably while keeping current consumption low when in sleep mode.

SUMMARY

Disclosed herein is a sleep-wake control circuit for a battery powered electronic device using a D-type flip-flop with a Schmitt trigger to detect pulse wake-up signal transitions. In one embodiment, the sleep-wake control circuit comprises an input channel, and a D-type flip-flop configured to maintain either a sleep mode or a wake mode. In another embodiment, the input channel is instead two distinct channels, a sleep command input channel and a wake command input channel. In one embodiment, the D-type flip-flop is configured to receive a sleep event signal to switch to sleep mode from the sleep command input channel as a clock signal and to receive a wake event signal to switch to wake mode from the wake command input channel as a clear signal.

In another disclosed embodiment, a wake event signal from the wake command input channel takes priority over a sleep event signal from the sleep command input channel.

In another disclosed embodiment, the sleep command input channel and the wake command input channel are configured as edge detection input channels. In another disclosed embodiment, the sleep command input channel and the wake command input channel pass the input signals through Schmitt triggers. In one embodiment, each input channel may have its own dedicated Schmitt trigger.

In another disclosed embodiment, the sleep-wake control circuit latches a signal value and produces an output signal based on the most recently detected input signal.

In another disclosed embodiment, the wake command input channel is configured to receive wake event signals from a plurality of wake event signal sources. In another disclosed embodiment, the plurality of wake event signal sources includes systems for monitoring the state of a vehicle door handle, a vehicle key input, and a vehicle gear setting. The plurality of wake event signal sources may further include a Controller Area Network (CAN) system or an internal timer system.

In another disclosed embodiment, the sleep-wake control circuit includes a means to functionally enable or functionally disable the battery powered electronic device based on the current mode of the sleep-wake control circuit. In another disclosed embodiment, the sleep-wake control circuit includes an output channel configured to send an output signal regarding the current mode of the sleep-wake control circuit. In another disclosed embodiment, the sleep-wake control circuit functionally enables or functionally disables the battery powered electronic device by means of the output signal.

In another disclosed embodiment, the sleep-wake control circuit controls the state of a power supply. In another disclosed embodiment, the power supply is a switched-mode power supply.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

Figure 1:
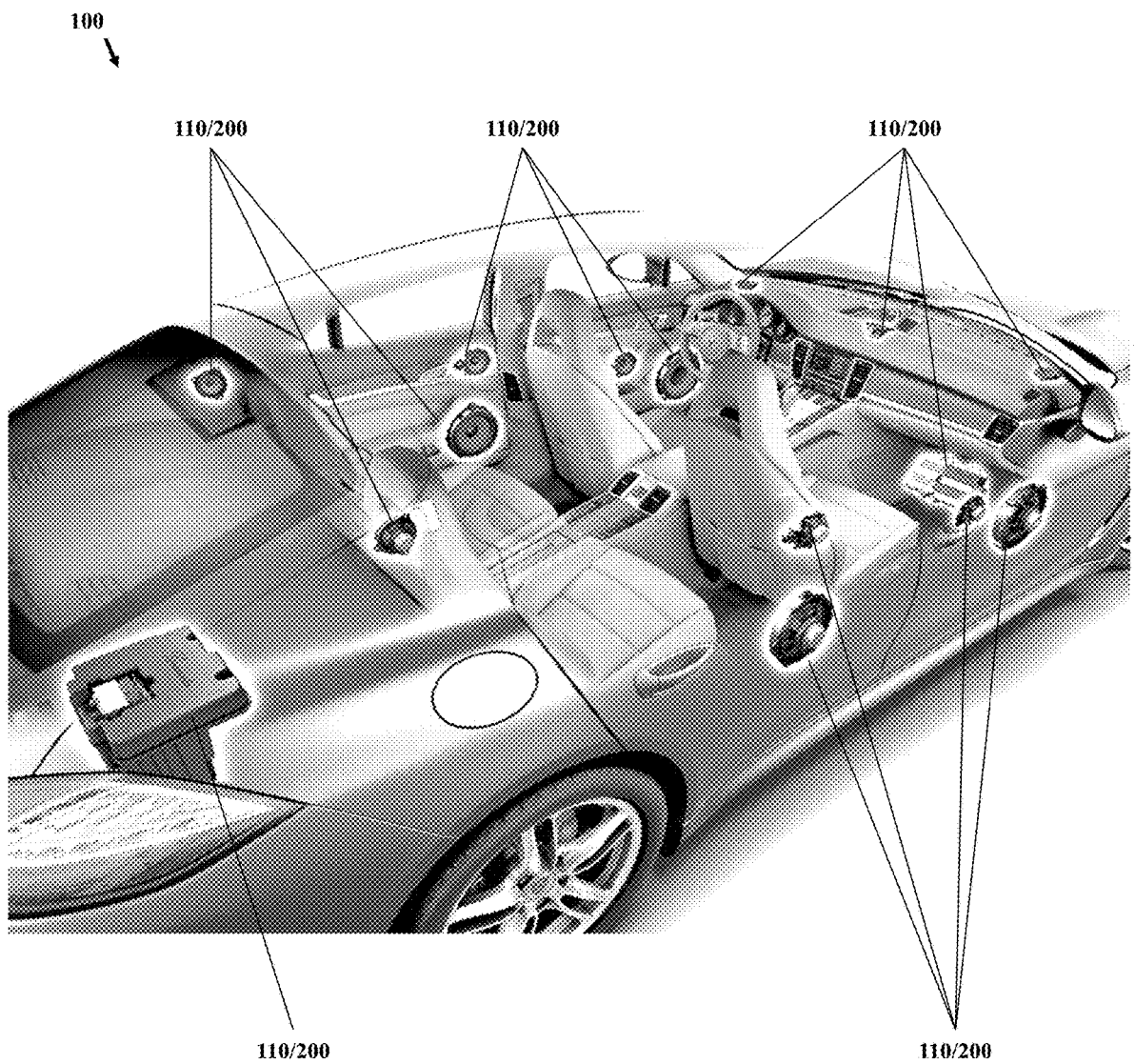
FIG. 1 is a perspective view of an exemplary embodiment of a vehicle which includes one or more sleep-wake control circuits.

One aspect of the disclosure is directed to a sleep-wake control circuit using a D-type flip-flop with a Schmitt trigger to detect pulse wake-up signal transitions.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative devices described herein may be combined in a single device, but the application is not limited to the specific exemplary combinations of sleep-wake control circuits that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The character "N" refers hereinafter to the last member of a set or the total count of members in a set. The character "X" refers hereinafter to a variable member of a set.

As used herein, the term "channel" refers to a physical connection between the output of one circuit element and the input of another circuit element. The channels described herein may be described as connectors between a specific input pin and a specific output pin, or they may be described as connecting to a specific input pin with an unspecified output pin, or they may be described as connecting to a specific output pin with an unspecified input pin.

As used herein, the term "sleep mode" refers to a mode of operation wherein an electrical component is not performing its primary operations but still draws power. Sleep mode may alternatively be referred to as standby mode or idle mode.

As used herein, the term "standby power" refers to the power drawn while an electrical component is in sleep mode.

As used herein, the term "quiescent current" refers to the amount of current drawn by an electrical component while the electrical component is in sleep mode.

As used herein, the terms "logic high" and "logic low" refer to the two potential states of a digital signal, wherein a digital signal is considered to be at logic high when the signal is carrying a higher voltage relative to a predetermined threshold, wherein the higher voltage is typically at or around the supply voltage of the device, and at logic low when the signal is carrying a lower voltage relative to a predetermined threshold, wherein the lower voltage is typically at or around the ground reference voltage (typically 0V).

As used herein, the term "inverted" refers to the state of a digital signal with respect to its original state. An inverted signal with a logic high original state is now in a logic low state, and an inverted signal with a logic low original state is now in a logic high state.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

FIG. 1 is a perspective view of an exemplary embodiment of a vehicle 100 which includes one or more sleep-wake control circuits 200. In one embodiment, the vehicle 100 may include one or more ECUs 110. Each of the one or more ECUs 110 may have a sleep-wake control circuit 200 controlling its state. According to one embodiment, the vehicle 100 may additionally or alternatively include one or more processors, microcontrollers or microprocessors, each of which may also have a sleep-wake control circuit 200 controlling its state.

It should be noted that while the sleep-wake control circuit 200 design depicted is configured for use with electronic systems of a vehicle 100, the sleep-wake control circuit 200 disclosed may be used with any electronic system which has need of a sleep mode, an operating/wake mode, and a control circuit for navigating state changes between the two modes.

Figure 2:
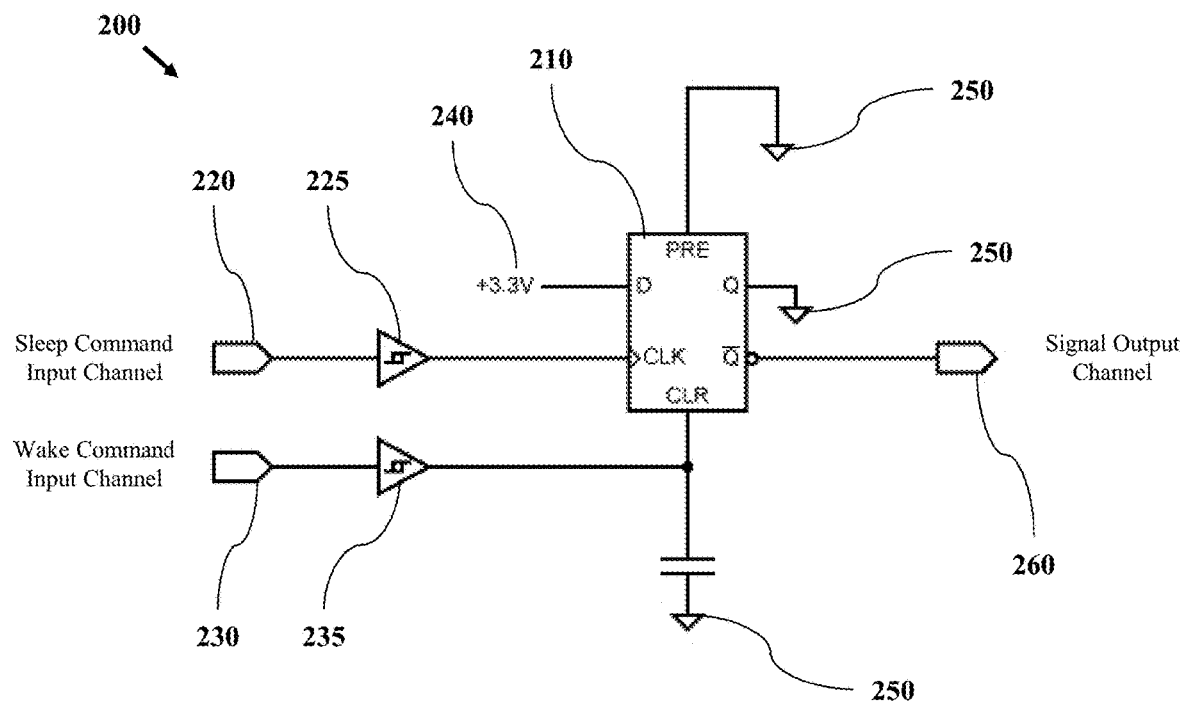
FIG. 2 is a circuit diagram of an exemplary embodiment of a sleep-wake control circuit.

FIG. 2 is a circuit diagram of an exemplary embodiment of a sleep-wake control circuit 200. In one embodiment, the sleep-wake control circuit 200 is configured to respond to a pulsed input signal (i.e., an input signal that is at logic high for a limited period of time, most typically a brief length of time). The pulsed input signal may be a sleep event signal or a wake event signal, and the sleep-wake control circuit 200 may be configured to receive sleep event signals and wake event signals along separate input channels. Each individual input channel of the sleep-wake control circuit 200 may be either level-triggered (i.e., configured to respond when the input signal is at logic high) or edge-triggered (i.e., configured to respond when the input signal value changes from one digital state to another).

According to one embodiment, the sleep-wake control circuit 200 comprises a D-type flip-flop 210, a sleep command input channel 220, a wake command input channel 230, a voltage source 240, a ground 250, and an output channel 260. The D-type flip-flop 210 may include a preset (PRE) input pin, a D input pin, a clock (CLK) input pin, a clear (CLR) input pin, a Q output pin, and an inverted Q ($\tilde{Q}$) output pin, wherein the $\tilde{Q}$ output pin carries an output signal value that is the inverse of the Q output signal value. In one embodiment, the $\tilde{Q}$ output pin may be connected to an inverter such that the inverter output signal value matches the Q output signal value. The PRE input pin and the Q output pin may be connected to ground 250. The D input pin may be connected to the voltage source 240. The voltage source 240 may be set at a voltage level of 3.3V. The CLK input pin may be edge-triggered; when a signal received at the CLK input pin from the sleep command input channel 220 transitions from logic low to logic high, the D-type flip-flop 210 updates the Q output signal value to logic high and the $\tilde{Q}$ output signal value to logic low. The CLR input pin may be level-triggered; when a signal received at the CLR input pin from the wake command input channel 230 is at logic high, the D-type flip-flop 210 updates the Q output signal value to logic low and the $\tilde{Q}$ output signal value to logic high. In one embodiment, the wake command input channel 230 may override the sleep command input channel 220 due to its connection to the CLR input pin of the D-type flip-flop 210. The Q output signal may be inverted and forwarded to the output channel 260 to serve as the output signal of the wake-sleep control circuit 200 as a whole.

In one embodiment, the D-type flip-flop 210 maintains either a sleep mode or a wake mode based on its current logic state. In one embodiment, a received sleep event signal may be an instruction for the D-type flip-flop 210 to switch to sleep mode. In one embodiment, a received wake event signal may be an instruction for the D-type flip-flop 210 to switch to wake mode. In one embodiment, the output signal produced by the D-type flip-flop may communicate the current mode of the D-type flip-flop 210 to other devices or circuit elements, which may include (but is not limited to) the ECU 110.

In one embodiment, the signal of the sleep command input channel 220 may be fed through a sleep channel Schmitt trigger 225 and the signal of the wake command input channel 230 may be fed through a wake channel Schmitt trigger 235. The Schmitt triggers 225 and 235 may then forward the signals to the CLK input pin and the CLR input pin of the D-type flip-flop 210, respectively. According to one embodiment, the Schmitt triggers 225 and 235 provide fast transition for the D-type flip-flop 210 to react properly when event signals are received. In one embodiment, the sources of the sleep command input channel 220 signal and the wake command input channel 230 signal may be subject to noise from the environment of the vehicle 100. In one embodiment, the Schmitt triggers 225 and 235 are hysteresis comparator circuit elements configured to act as filters and reduce the effect of such noise on the signals of the sleep command input channel 220 and the wake command input channel 230 by acting as input buffers, thereby providing robust signals for the wake-sleep control circuit 200.

In one embodiment, the Q and $\tilde{Q}$ output signal values are latched; the Q and $\tilde{Q}$ output signals maintain their current value, thereby maintaining the wake-sleep control circuit 200 in either sleep mode or wake mode, until at least one of the input pins of the D-type flip-flop 210 is triggered again, even if the input signal that previously triggered the D-type flip-flop 210 was a pulsed input signal or required edge detection. In one embodiment, the latched values can be easily cleared by the ECU 110 or another microcontroller, by means of the ECU 110 or another microcontroller directly toggling the input at the CLR input pin of the D-type flip-flop 210.

Figure 3:
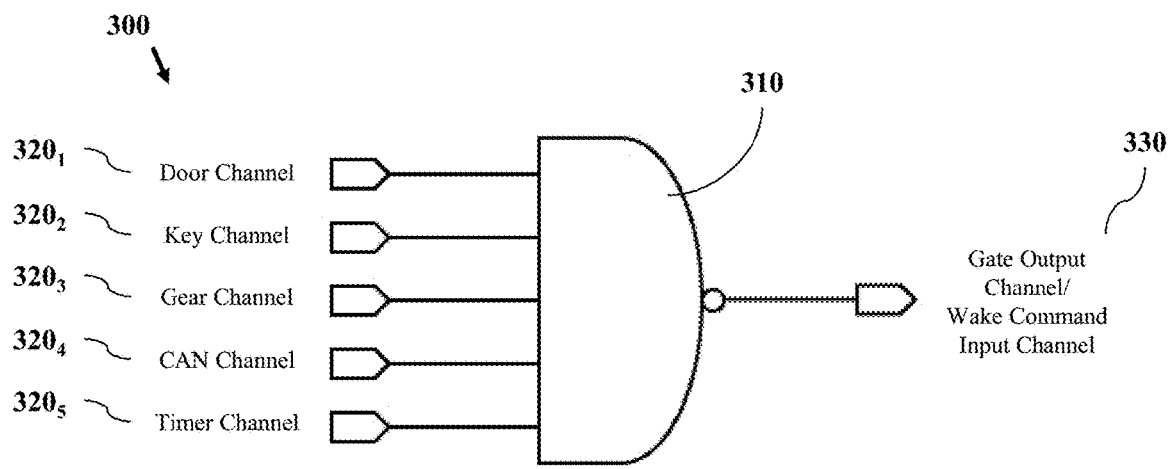
FIG. 3 is a circuit diagram of an exemplary embodiment of an input signal collector for collecting a plurality of input signals.

FIG. 3 is a circuit diagram of an exemplary embodiment of an input signal collector 300 for collecting a plurality of wake event signals. In one embodiment, the input signal collector 300 may comprise a logic gate 310, a plurality of wake channels $320_{1-5}$, and a gate output channel 330.

In one embodiment, the plurality of wake channels $320_{1-5}$ includes a door channel $320_1$, a key channel $320_2$, a gear channel $320_3$, a CAN channel $320_4$, and a timer channel $320_5$. The door channel $320_1$ may be a channel to receive a wake event signal from a system for monitoring the status of a vehicle door, and in particular a handle of the vehicle door. The key channel $320_2$ may be a channel to receive a wake event signal from a system for monitoring the presence of a vehicle key in an ignition slot or a door slot. The gear channel $320_3$ may be a channel to receive a wake event signal from a system for monitoring the current gear setting of the vehicle (e.g. park, neutral, drive). The CAN channel $320_4$ may be a channel to receive a wake event signal from a Controller Area Network system. The timer channel $320_5$ may be a channel to receive a wake event signal from a timer system. The above described combination of wake channels $320_{1-5}$ should be considered exemplary; the input signal collector 300 may receive any subset of the above described wake channels $320_{1-5}$, as well as additional wake channels $320_X$ not presently described.

According to one embodiment, the input signal collector 300 may use a logic gate 310 to collect the one or more wake event signals received by the plurality of wake channels $320_{1-5}$. Though the logic gate 310 depicted is depicted as a NAND gate, it should be understood that any logic gate may be used to collect the one or more wake event signals as required by the overall system design.

According to one embodiment, the input signal collector 300 may produce a wake event signal for delivery to a gate output channel 330. The gate output channel 330 may connect to the wake command input channel 230 of FIG. 2, such that the wake command input channel 230 receives a wake event signal at logic high as long as the input signal collector 300 receives at least one wake event signal from at least one of the wake channels $320_{1-5}$. According to one embodiment, the sleep command input channel 230 may receive sleep event signals from an additional input signal collector configured to collect multiple sleep channel sources.

Figure 4:
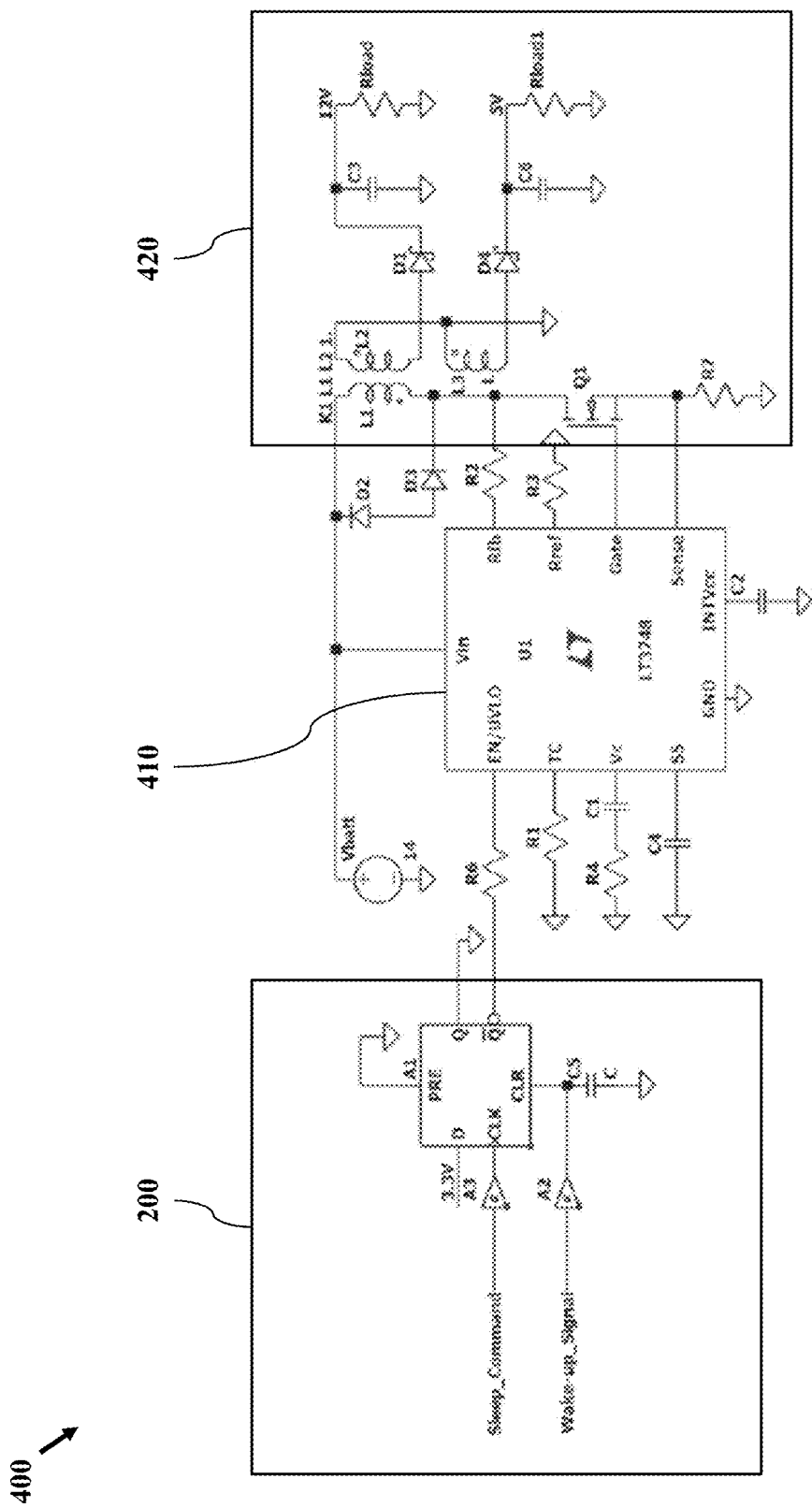
FIG. 4 is a circuit diagram of an exemplary embodiment of a power supply circuit including a sleep-wake control circuit.

FIG. 4 is a circuit diagram of an exemplary embodiment of a power supply circuit 400 including a sleep-wake control circuit 200. According to one embodiment, the power supply circuit 400 comprises a sleep-wake control circuit 200, an isolated flyback controller 410, and a flyback converter 420.

In one embodiment, the isolated flyback controller 410 may be an LT3748 chip that is responsible for managing the flyback converter 420 that supplies power to the ECU 110. In one embodiment, the isolated flyback controller 410 may accept the wake event signal output 260 of the sleep-wake control circuit 200 as an Enable/Undervoltage Lockout (EN/UVLO) input. In one embodiment, the sleep-wake control circuit 200 may enable the power supply for the ECU 110 by enabling the isolated flyback controller 410. In one embodiment, when the output signal Q of the output channel 260 is set to logic low (corresponding with sleep mode), the isolated flyback controller 410 is disabled and the power supply circuit 400 operates in sleep mode. In one embodiment, when the output signal Q of the output channel 260 is set to logic high (corresponding with wake mode), the isolated flyback controller 410 is enabled and the power supply circuit 400 operates in wake mode with full functionality. In one embodiment, the output signal of the output channel 260 may correspond with the most recently detected and latched wake-up signal.

In one embodiment, the power supply circuit 400 is designed to continue operating with full functionality (e.g., supplying power) while the power supply circuit 400 transitions from wake mode to sleep mode. In one embodiment, the power supply circuit 400 draws a quiescent current from an auxiliary battery to maintain minimum functionality while in sleep mode.

It should be understood that although FIG. 4 uses a power supply circuit 400 as an example circuit to be controlled by a wake-sleep control circuit 200, it is possible to control any circuit with a wake mode and a sleep mode using the wake-sleep control circuit 200.

Figures 5A, 5B:
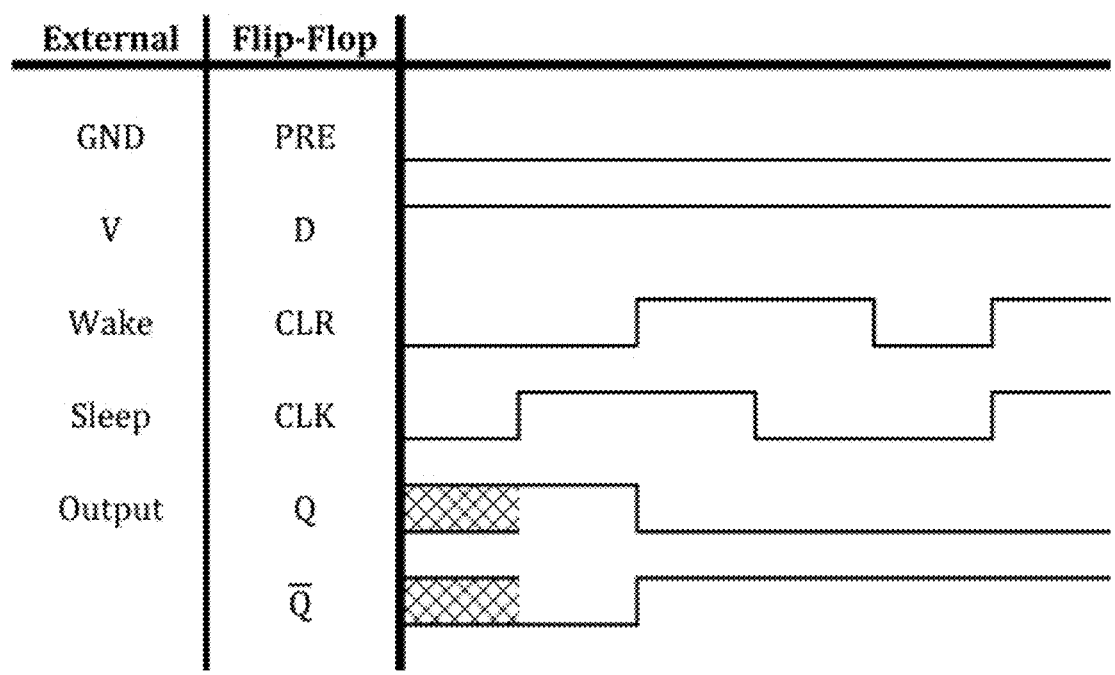
FIG. 5A is a truth table depicting the output signal values resulting from all possible combinations of input signal values for an exemplary embodiment of a sleep-wake control circuit.
FIG. 5B is a timing diagram corresponding to the truth table of FIG. 5A.

FIG. 5A is a truth table depicting the output signal values resulting from all possible combinations of input signal values for an exemplary embodiment of a sleep-wake control circuit 400. FIG. 5B is a timing diagram corresponding to the truth table of FIG. 5A. In one embodiment, the signal values of the PRE and D input pins of the D-type flip-flop 210 are set to logic low and logic high, respectively. In one embodiment, the Q output signal value is the inverse of the $\tilde{Q}$ output signal value. In one embodiment, the signal value of the CLR input pin is equivalent to the signal value of the wake command input channel 230 and the signal value of the CLK input pin is equivalent to the signal value of the sleep command input channel 220. In one embodiment, when the CLR input signal value is at logic low and when the CLK input signal value switches from logic low to logic high, the D-type flip-flop 210 sets the value of the Q output signal to logic high and the sleep-wake control circuit is considered to be in sleep mode. In one embodiment, when the CLR input signal value is at logic high, the D-type flip-flop 210 sets the value of the Q output signal to logic low and the sleep-wake control circuit is considered to be in wake mode. In one embodiment, the D-type flip-flop 210 ignores signals received at the CLK input pin while the CLR input signal is at logic high; in this manner, the D-type flip-flop 210 may give priority to any signals received at the CLR input pin. In one embodiment, the D-type flip-flop 210 may be configured to maintain its most recent mode when the CLR input signal is at logic low and the CLK input signal value either maintains a steady state or switches from logic low to logic high.

While this disclosure makes reference to exemplary embodiments, it will be understood by those skilled in the art that various changes in form and details may be made therein without departing from the scope of the claimed embodiments.

What is claimed is:

1. A vehicle comprising:
   a flyback converter electrically connected to an electronic vehicle device;
   a controller electrically connected to said flyback converter;
   a sleep-wake control circuit for controlling the state of the flyback converter via the controller, wherein the sleep-wake control circuit includes a sleep command input, a wake command input, and a D flip-flop configured to maintain either a sleep mode or a wake mode;
   wherein the D flip-flop is configured to receive a sleep event signal to switch to sleep mode from the sleep command input as a clock signal via a clock input pin, wherein the sleep event signal is fed through a first Schmitt trigger before being received by the clock input pin;
   wherein the D flip-flop is configured to receive a wake event signal to switch to wake mode from the wake command input as a clear signal via a clear input pin, wherein the wake event signal is fed through a second Schmitt trigger before being received by the clear input pin;
   said D flip-flop includes an output electrically connected to the controller via an enable/undervoltage lockout input pin such that when the output of the D flip-flop is set to logic low corresponding with the sleep mode, the controller is disabled and the flyback converter operates in the sleep mode, and when the output of the D flop-flop is set to logic high corresponding with wake mode, the controller is enabled and the flyback converter operates in the wake mode.

* * * * *